Patented June 30, 1925.

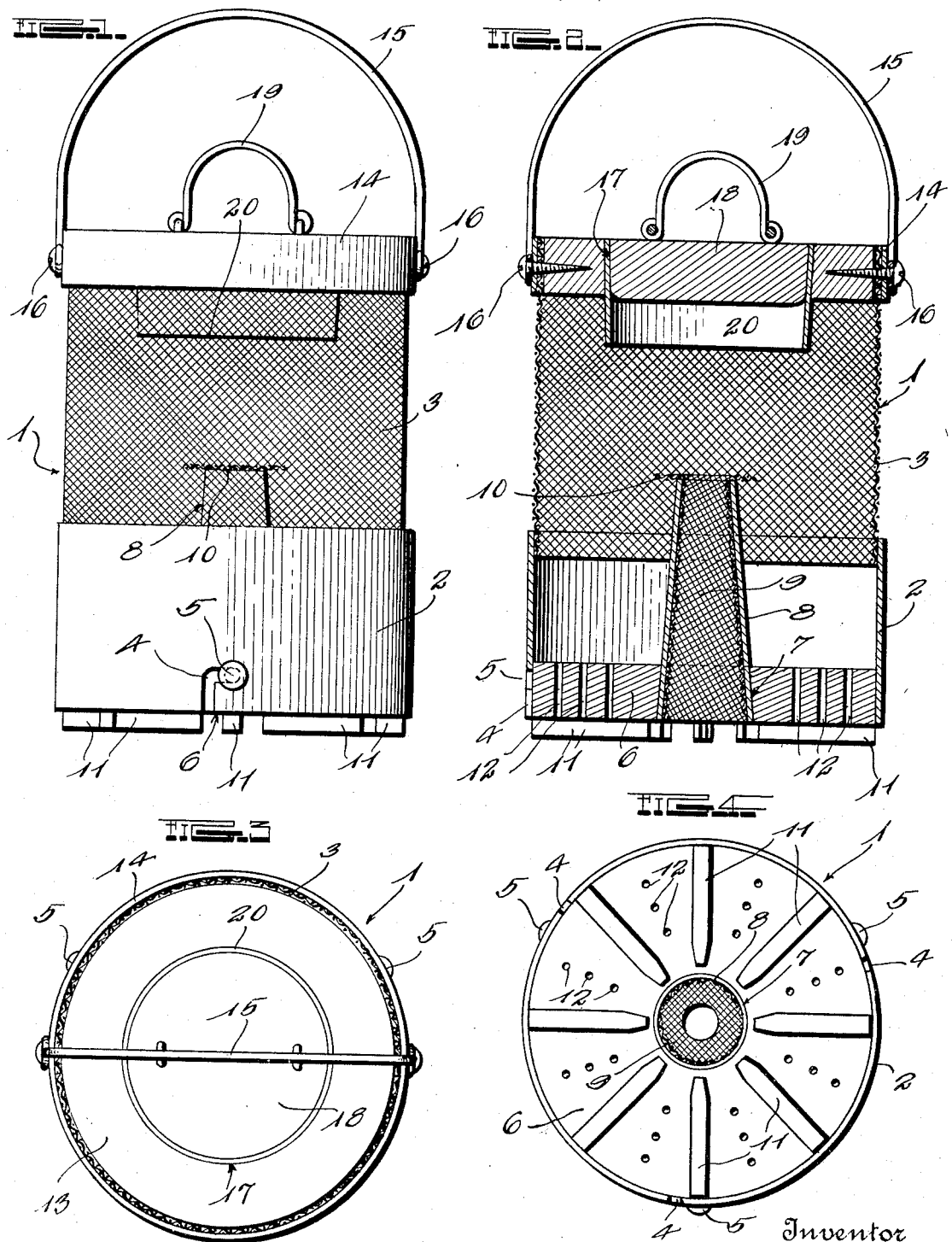

1,543,968

UNITED STATES PATENT OFFICE.

SION H. WILLIAMS AND CARLOS O. NEELY, OF HORNBEAK, TENNESSEE.

COMBINATION INSECT TRAP AND BAIT BUCKET.

Application filed December 11, 1922. Serial No. 606,246.

*To all whom it may concern:*

Be it known that SION H. WILLIAMS and CARLOS O. NEELY, citizens of the United States, residing at Hornbeak, in the county of Obion and State of Tennessee, have invented certain new and useful Improvements in Combination Insect Traps and Bait Buckets; and we do declare the following to be a full, clear, and exact description of the invention, such as will enable others skilled in the art to which it appertains to make and use the same.

Our invention relates to improvements in insect traps and has for its primary object to provide a trap for catching roaches and other insects which can be used for fishing bait, the device being of such construction that it may be carried by a fisherman and opened at will to remove some of the insects for bait.

In carrying out the above end, a secondary object is to provide the trap with a hand hole through which a human hand may enter to remove the bait and to provide the top of the container in which said hand hole is formed, with a depending annular wall around said hole, for the purpose of preventing any of the insects from crawling out of said hole, when it is open.

A still further object is to provide an improved form of entrance into the trap, which will prevent any of the insects from leaving through this passage.

A still further object is to provide the trap with a removable bottom having on its lower side a plurality of radial ribs which guide the insects to the entrance passage and also serve as handles by means of which the bottom may be released.

With the foregoing in view, the invention resides in the novel subject matter hereinafter described and claimed, the description being supplemented by the accompanying drawing.

Figure 1 is a side elevation of a combined trap and bait bucket constructed in accordance with my invention.

Fig. 2 is a vertical sectional view.

Fig. 3 is a top plan view.

Fig. 4 is a bottom plan view.

In the drawing above briefly described, the numeral 1 designates an upright container which is preferably of cylindrical form, the vertical wall of said container being preferably formed of a lower sheet metal section 2 and an upper screen wire or foraminous body or section 3, the two sections being suitably secured together. The lower end of the section 2 is provided with bayonet slots 4 which receive projecting studs 5 on a removable bottom 6 which is received within the lower end of said section 2. The center of the bottom 6 is provided with an opening 7 and an upwardly tapered sheet metal sleeve 8 rises from said bottom at the wall of the opening, this sleeve being provided with a screen wire lining 9 whose upper end is turned outwardly and extends beyond the sleeve as indicated at 10. The lining 9 permits roaches and other insects to readily ascend through the sleeve 8 but it will be seen that the flange 10 will prevent egress, even if the insects find it possible to crawl up the vertical exterior of the sleeve. The lower side of the bottom 6 is provided with a plurality of radial ribs 11 which define entrance passages leading to the entrance sleeve 8. These ribs 11 are intended to rest upon a floor or any other support and to thereby space the bottom 6 upwardly from such support as will be readily understood. If desired, the bottom may be formed with openings 12 between the ribs 11, of sufficient size to permit an insect to pass, which is insufficiently large for fishing bait.

In addition to the functions above pointed out for the ribs 11, it will be seen that they serve as handles by means of which the bottom 6 may be turned to relieve the studs 5 from engagement with the slots 4, when the bottom is to be removed.

A suitable top 13 is secured in the upper end of the screen wire section 3, which end is preferably metal-bound as indicated at 14, an appropriate carrying bail 15 being connected with the binding at the top by screws or the like 16. The top 13 is provided with a hand hole 17 normally closed by a removable plug or the like 18 which may well have a handle 19 by means of which it can be easily removed. An annular or inverted frusto-conical imperforate metal lip or wall 20 depends from the top 13 to prevent any insects upon the lower surface of the top from crawling out of the opening 17 when the closure 18 is removed and the hand is inserted into the container for removing some of the insects, to be used as fishing bait. We prefer that the wall 20 shall be downwardly tapered and that it shall line the opening 17 for snug engagement with the closure 18, which is also tapered to some extent.

By the use of my invention, insects which can be used as fishing bait, may be caught and carried to the place at which they are to be used, and whenever necessary, the closure 18 may be removed and some of the insects readily reached for bait.

As excellent results may be obtained from the details disclosed, they are preferably followed, but within the scope of the invention as claimed, numerous minor changes may be made.

We claim:—

1. A device of the class described comprising a container, a removable bottom detachably connected with the wall of said container and having an entrance passage, means for connecting said container and bottom, said bottom being removable by turning said bottom relative to said container and radial ribs on the lower side of said bottom defining other entrance passages leading to the first named passage, said ribs having the additional function of handles for turning the bottom to disconnect it from said container.

2. A device of the class described comprising a container having a side wall provided with bayonet slots in its lower end, a removable bottom fitting within said wall and having an entrance passage, radial ribs on the lower side of said bottom defining other entrance passages leading to the first-named passage, and studs on the edge of said bottom received in said bayonet slots, said ribs acting as handles for turning the bottom to release said studs from said slots.

3. A bait bucket comprising a foraminous body having an open top surrounded by an inverted frusto-conical imperforate metal lip depending thereinto, a detachable bottom having means for entrapping roaches and the like in the bucket, and a handle, substantially as described.

In testimony whereof we have hereunto affixed our signatures.

SION H. WILLIAMS.
CARLOS O. NEELY.